June 7, 1949.                    C. E. POWERS                    2,472,123
                              TIRE MAKING MACHINE
Filed Aug. 30, 1945                                              5 Sheets-Sheet 1

Inventor
CONIOUS E. POWERS
By A. F. Flournoy
Attorney

June 7, 1949.　　　　　C. E. POWERS　　　　　2,472,123
TIRE MAKING MACHINE

Filed Aug. 30, 1945　　　　　　　　　　　　5 Sheets-Sheet 2

Inventor
CONIOUS E. POWERS

By

*A. F. Flournoy*

Attorney

June 7, 1949.                    C. E. POWERS                    2,472,123
                              TIRE MAKING MACHINE
Filed Aug. 30, 1945                                        5 Sheets-Sheet 4

Inventor
CONIOUS E. POWERS
By  A. F. Flournoy
                Attorney

June 7, 1949.  C. E. POWERS  2,472,123
TIRE MAKING MACHINE
Filed Aug. 30, 1945  5 Sheets-Sheet 5

Inventor
CONIOUS E. POWERS
By
A. F. Flournoy
Attorney

Patented June 7, 1949

2,472,123

UNITED STATES PATENT OFFICE 2,472,123

TIRE MAKING MACHINE

Conious E. Powers, Natchez, Miss.

Application August 30, 1945, Serial No. 613,595

14 Claims. (Cl. 154—10.6)

My invention relates to tire building machines, but more particularly to stitching and roller means for joining together the various plies of fabric going into the make-up of a tire carcass on a tire building drum.

This patent application is a continuation in part of my patent application for tire stitching apparatus, Serial Number 472,570, filed January 16, 1943, now abandoned.

My invention does not include a tire drum construction and the means for operating it. That is to say, my invention in stitching roller mechanisms is to be used with prior art tire drums. In my drawings I show a simple straight sided drum with a bead seat used in conjunction with my invention, but it is to be understood that my invention may be used with all types of drums with or without bead seats or with other variations, if desired.

An object of my invention is to provide in tire making machines a stitching roller mechanism the rollers of which may be so moved as to contact all of the outer surface of tire plies laid on a tire drum that need to be stitched by the rollers.

Another object of my invention is to provide a tire making machine that is adapted to stitch tire plies both on the horizontal outer surface of a drum and stitch tire plies around tire beads set in the ends of tire drums.

Another object of my invention is to provide in tire making machines a cam controlled stitching roller mechanism by means of which the roller may be made to travel in a curvilinear path approximating the profile of a layer of tire fabrics placed on a tire drum.

Another object of my invention is to provide in tire making machines a stitching roller mechanism the rollers of which in their operation are pressed against tire fabrics on a tire drum through the means of a yieldable connecting means to allow the rollers to accommodate themselves to variations in the profile contour of layers of fabric on a tire drum.

Other objects and advantages of my invention will appear from a reading of my detailed description to follow of a tire making machine embodying my invention illustrated by my accompanying drawings.

Figure 1:
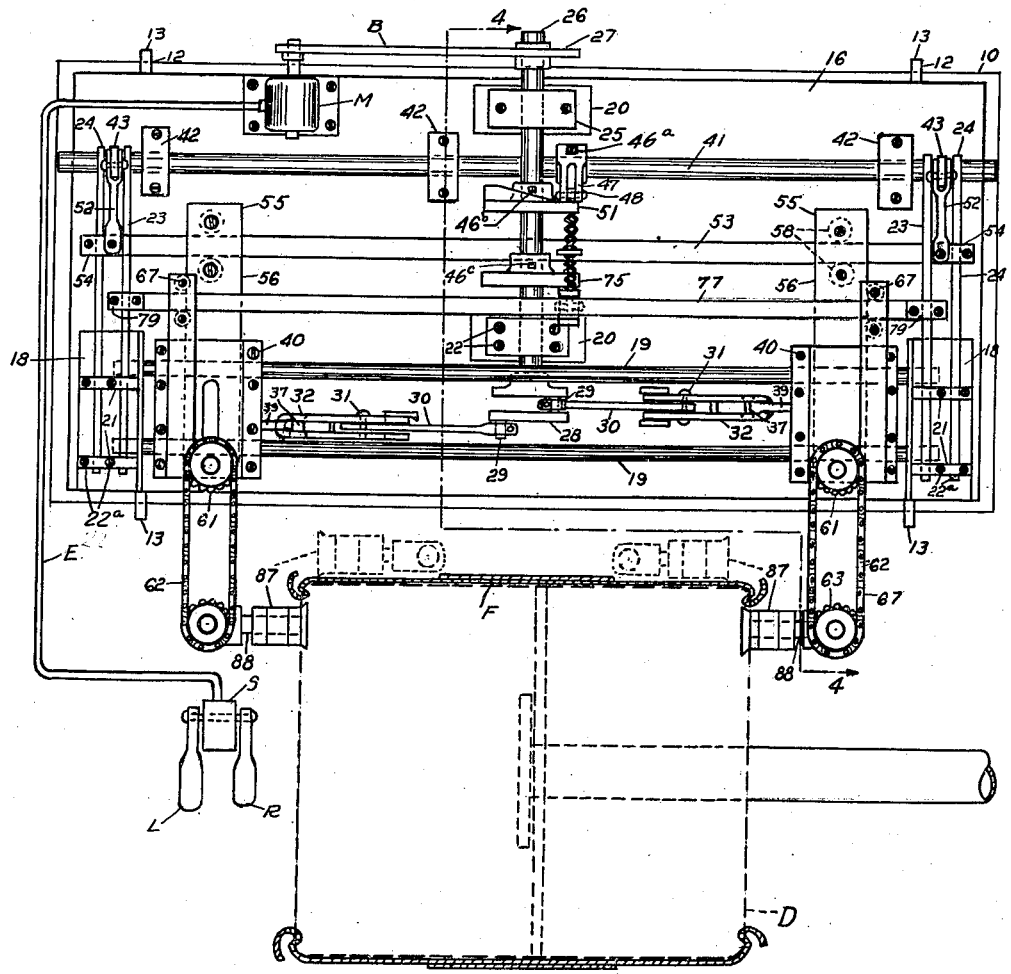
Figure 1 is a plan view of a tire making machine embodying my invention.
Figures 2, 3:
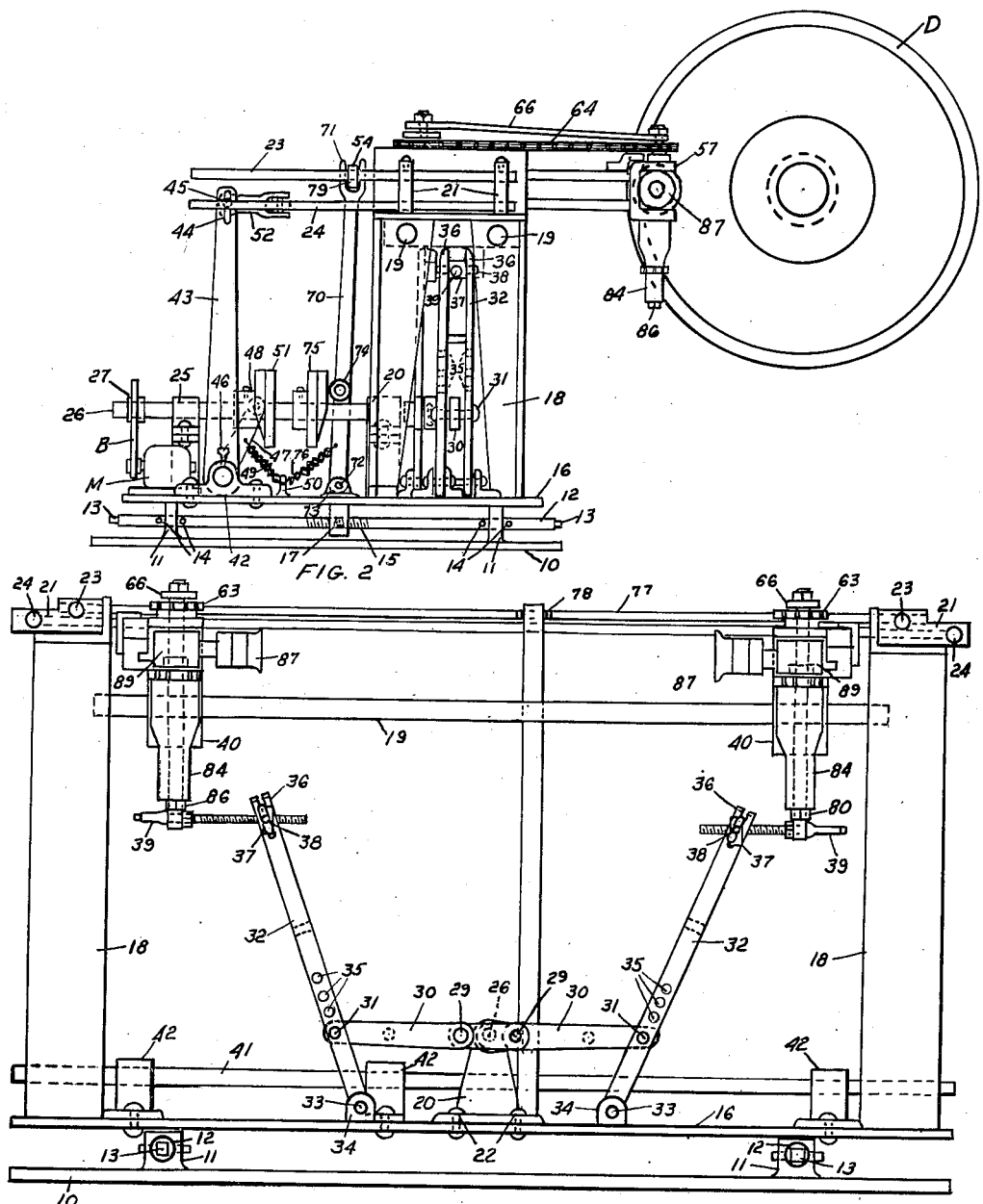
Figure 2 is a left end elevation view of the tire making machine illustrated in Figure 1.
Figure 3 is a front elevation view of the tire making machine illustrated in Figure 1 with the tire drum removed.
Figure 4:
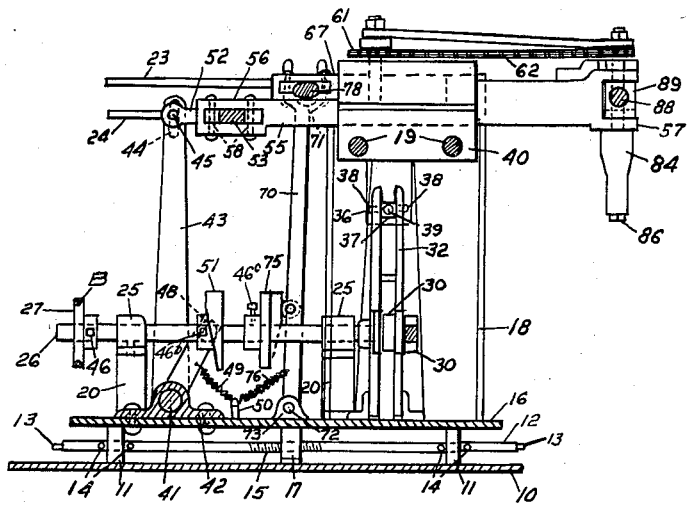
Figure 4 is a vertical cross sectional view taken on line 4—4 of Figure 1.

Before entering into my detailed description of my invention, I will give a brief outline of its function. In the operation of my invention the operator stands in front of the drum D. In my description to follow the structure designated as right handed and left handed will correspond with the operator's right and left hand when facing the drum D.

I have incorporated in my invention in tire making machines a pair of rollers and suitable mechanisms designed to move the rollers in unison on a conventional tire drum D. My specification will not embrace any detailed description of the drum D or its driving mechanism since they form no part of my invention.

I incorporate in my tire making machine means for moving the rollers longitudinally with respect to the axis of the drum D which means will hereafter be referred to as the longitudinal roller moving means.

In my mechanism I have incorporated a means for moving the rollers into contact with the rear wall of the drum D hereafter to be called the roller advancing mechanism.

Another roller moving mechanism that I incorporate in my tire making machine turns the roller spindles on which the rollers are rotatably mounted in horizontal planes to cause the rollers to make contact with the horizontal surface of the drum D and make contact with the drum D around the ends of the same, which mechanism will be hereafter referred to as the roller shaft turning mechanism.

My tire making machine is adjustably mounted on an anchoring plate 10 which may be fastened, if desired, to a factory floor. However, due to the weight of my tire making machine itself, it is not necessary to fasten the anchoring plate 10 to the floor surface.

Two pairs of equally spaced perforated anchor lugs 11 are extended up from the anchor plate 10 to support the weight of the whole tire making machine. A duplicate pair of positioning rods 12 are rotatably mounted in the perforated lugs 11. The positioning rods 12 may be turned by a wrench applied to their square ends 13. Pairs of spaced stop pins 14 are extended through the positioning rods 12 on opposite sides of the anchor lugs 11 to prevent the positioning rods 12 from moving through the perforated lugs 11. Each positioning rod 12 is provided with a central threaded portion 15 with which depending threaded lugs 17 are engaged. The depending lugs 17 are made integral with the base plate 16 on which other frame members and moving parts of my illustrated tire making machine are mounted in sliding relationship with the anchor plate 10.

My tire making machine may be nicely positioned with respect to a tire drum D on which it operates by rotating the positioning rods 12 in clockwise or counterclockwise directions as the case demands. After my tire making machine is positioned by means of the positioning rods 12, it is allowed to stay in such adjusted position during the entire time a particular class of work is being performed by it. The positioning rods 12 bring my tire making machine within working range of the tire drum D.

A pair of parallel side plates 18 are welded to and extended upwardly from the base plate 16. A pair of parallel crosshead guide rods 19 are fastened to the side plates 18. A pair of driving shaft bearing supports 20 are extended upwardly from the base plate 16 and fastened to same by bolts 22.

The main frame work of my machine is completed by two pairs of guide rods extending from the front toward the back of and parallel to the base plate 16. I mount these guide rods on the top of the side plates 18 by means of pairs of guide rod supporting blocks 21 fastened to the side plates 18 by bolts 22a. These guide rods are arranged as an inside pair of guide rods 23 positioned above the outside pair of guide rods 24. On the frame work above described, the moving parts of my machine are mounted.

All of the moving parts of my tire making machine to be described in detail hereafter are actuated through the means of the driving shaft 26 which is turned by means of the motor M connected to a source of power not shown through the means of an electric cable E which leads through a reversing control switch S. The control switch S is provided with a right hand switch pedal R and a left hand switch pedal L so arranged that the operator may press the right pedal R or the left pedal L with his foot to cause the driving shaft 26 to rotate in a clockwise or counterclockwise direction as the need arises. When he takes his foot off of the right pedal R or the left pedal L, the motor power is shut off.

The motor M bolted directly to the base plate 16 turns the driving shaft 26 through the means of the V belt B engaging the driven pulley 27. The driving shaft 26 is rotatably mounted on a pair of split bearings 25 bolted directly to the base plate 16. The front end of the driving shaft 26 is provided with a crankhead 28 which is keyed to the same. The crankhead 28 is provided with a pair of oppositely positioned offset crank pins 29 through the means of which reciprocating motions are imparted to the crossheads 40 slidably mounted on the guide rods 19. The off-set crank pins 29 are spaced equal radial distances from the axis of rotation of the driving shaft 26.

The longitudinal roller moving means mentioned earlier in this specification is comprised of the pair of crossheads 40 which are slidably mounted on the guide rods 19 and the link mechanism by means of which they are connected to the offset crank pins 29. These link mechanisms start with the connecting rods 30 which are pivotably mounted to the offset crank pins 29 and by means of connecting pins 31 to the A frames 32 constituting levers pivotably connected to the base plate 16. The pivoted A frames 32 are pivotably mounted by means of pivot pins 33 to the lever brackets 34 secured to the base plate 16. The pivoted A frames 32 are provided with a series of stroke adjusting holes 35 in which the connecting pins 31 may be selectively positioned to vary the distance the bifurcated slotted upper ends 36 of the pivoted A frames 32 are caused to move and through which movement the longitudinal strokes of the crossheads 40 are accomplished.

The crossheads 40 are adjustably connected to the slotted upper ends 36 of the A frames 32 by means of the trunnion nuts 37 provided with pivot pins 38 resting in the slotted upper ends 36 of the pivoted A frames 32. Pull rods 39 which are threadedly engaged in the trunnion nuts 37 to permit horizontal adjustment are used to connect the crossheads 40 with the pivoted A frames 32.

The reader will appreciate that the higher up the connecting rod 30 is connected into the A frames 32, the shorter the stroke of the A frames 32 will be. The longitudinal dimension of the drum D to be worked on dictates the stroke adjustment of the A frames 32 and the position of the setting of the crossheads 40 with respect to the A frames 32 as accomplished by means of the threaded pull rods 39.

After the above mentioned adjustments have been made, they are left set throughout the operations of the machine as long as the machine is being used with a particular drum D.

Figure 11:
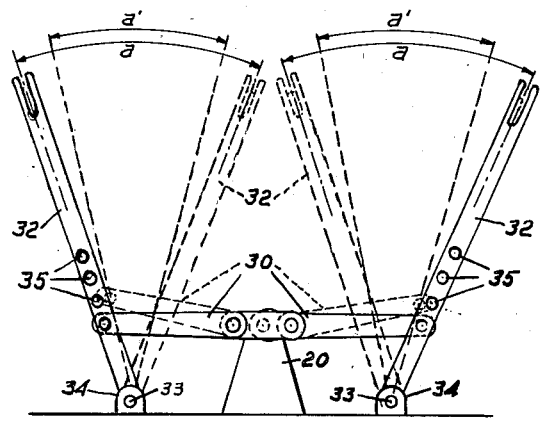
Figure 11 is a diagrammatic view illustrating an adjustment of a part of the tire making machine illustrated by Figure 1.
Figure 13:
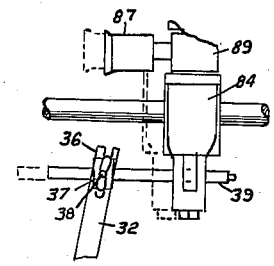
Figure 13 is a diagrammatic view illustrating an adjustment of a part of the tire making machine illustrated by Figure 1.
Figure 14:
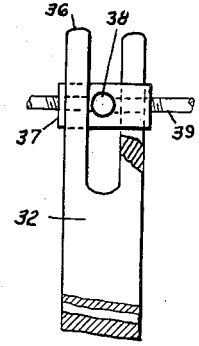
Figure 14 is an enlarged view of a portion of the machine best illustrated in Figure 3 and, Figure 15 is an enlarged view of a portion of the machine illustrated in Figure 1.
Figure 15:
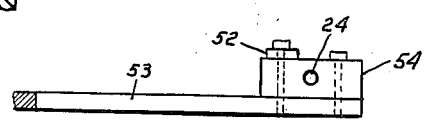

At this point the reader's attention is directed to the diagrammatic view shown in Figure 11 which illustrates the effect of changing the connecting point of the connecting rod 30 with A frame 32 from the lowest stroke adjusting hole 35 to the next one higher. When the connecting rods 30 are connected into the lowest adjusting hole 35, the upper ends 36 of the A frames 32 travel through an arc $a$, but when they are connected into the next higher adjusting holes 35, they are caused to travel through a shorter arc of travel $a'$ resulting in a shortened stroke for the crossheads 40. The stroke of the crossheads 40 is set to comply with the longitudinal dimension of any particular drum D on which my tire making machine is in operation. The position of the crossheads 40 with respect to the upper ends 36 of the A frames 32 through the means of the pull rods 39 is best seen in Figure 13 of the drawing.

Rotations of the driving shaft 26 produce the reciprocating movements of the crossheads 40 which reciprocating movements are continued as long as the operator holds his foot down on either the right hand pedal R or the left hand pedal L of the control switch S. The operator may move the crossheads 40 slight distances in their travel toward each other or away from each other by using the right hand pedal R or the left hand pedal L depending upon the direction of rotation of the crankhead 28 at any given moment.

The reciprocating motion of the crossheads 40 accomplished through the means of the above described mechanism is carried on in a positive manner and independent of the setting of cams dictating other motions imparted to the rollers 87 through the means of mechanisms hereafter described in this specification. It is pointed out here to the reader, however, that the other motions imparted to the rollers 87 are governed by the driving shaft 26 since the movements of these mechanisms are governed by cams, the roller advancing cam 51, controlling the roller advancing mechanism, and the rack cam 75, controlling the movements of the rack 67, both of which cams are attached directly to the driving shaft 26 and rotate with the driving shaft 26. The functions of these cams will be further explained in the course of my descriptions to follow of the mechanisms controlled by them.

The next roller actuating mechanism that I will describe is the roller advancing mechanism mentioned above which commences with the throw shaft 41 rotatably mounted in the throw shaft bearings 42 secured to the base plate 16. A pair of lever arms 43 are attached by means of set screws 46 on the ends of the throw shaft 41. A cam lever 47 provided with a cam following roller 48 in its upper end is also secured to the throw shaft 41 by means of a set screw 46a.

Through the means of a tension spring 49 attached to the cam lever 47 and to the eyelet 50, welded to the base plate 16, the throw shaft 41 carrying the lever arms 43 is rocked in a forward direction, that is to say, a direction toward the drum D. However, the manner of the forward rocking motion is governed by the roller advancing cam 51. This roller advancing cam 51 may be adjustably mounted in both longitudinal directions on the driving shaft 26 and circumferentially of the same by means of set screws 46b.

The reader should bear in mind that these various adjustments are of particular advantage in my tire making machine to make it adaptable for use with varying sizes of drums D and also advantageous in making adjustments in the length of and the character of the various motions that must be imparted to the rollers 87 to make them perform the complicated movements they must perform in carrying out varying operations in the manufacture of tires.

The design of the cam 51 is dictated by the profile contour of the drum D and layers of fabric F placed on the drum D. Connecting rods 52 are joined to the slotted upper ends 44 of the lever arms 43 by means of bolts 45 and are connected to the ends of the shifting bar 53 by means of bolts 45. The shifting bar 53 is slidably mounted on the outside pair of guide rods 24 by means of the guides 54 fastened on the ends of the shifting bar 53.

The shifting bar 53 is slidably engaged with the two roller carriages 55 by being extended through the rear slotted ends 56 of the same between the pairs of rollers 58. By virtue of this arrangement, the roller carriages 55 may be carried in crosswise directions by the crossheads 40 in which they are slidably engaged without varying the movement of the shifting bar 53 as dictated by the cam 51. Under normal operating conditions, the roller carriages 55 are given the forward and backward motions with respect to the side of the drum D under the power of the tension spring 49 controlled by the roller advancing cam 51 at the same time that the crossheads 40 are carrying the roller carriages 55 in directions parallel to the face of the drum D.

The roller spindle turning mechanism mentioned earlier in this specification includes the roller carriage 55 and the sliding rack 67. At this point I want to explain to the reader that the roller spindles 88 are turned through means of the chain 62 engaged with the chain driving sprocket 61 and the driven sprocket 63 carried by the roller carriages 55. The turning movements of the spindles 88 result from relative movements of the roller carriages 55 with respect to the sliding racks 67.

Before giving a detailed description of the roller spindle turning mechanism, I will describe the mechanism that moves the sliding racks 67 in directions to and from the drum D independent of the motions imparted to the roller carriages 55 as afore described.

The sliding racks 67 are moved in a similar manner to the way in which the roller carriages 55 are moved. The mechanism for moving the sliding racks 67 commences with the rack moving lever 70 which is pivotably mounted on the base plate 16 by means of a pivot pin 72 extending through the lower end of the rack moving lever 70 and the slotted lever bracket 73 welded to the base plate 16. A cam following roller 74 is rotatably mounted on the rack moving lever 70 opposite the rack cam 75 through the means of which cam 75 the sliding rack 67 is moved in its forward direction through the means of the rack shifting bar 77 which is actuated by the rack moving lever 70 connected to the rack shifting bar 77 near its center. The rack moving lever 70 is provided with a slotted upper end 71 embracing the rounded portion 78 of the rack shifting bar 77. By means of this driving arrangement, the rack shifting bar 77 is moved back and forth in positive smooth manners as dictated by the rack cam 75.

The rack shifting bar 77 is extended through the slotted ends 68 of the sliding racks 67 embraced by pairs of rollers 69 rotatably mounted in the slotted ends 68. The rack shifting bar 77 is provided with guides 79 through which the inside pair of guide rods 23 extend to compel the rack shifting bar 77 to stay always parallel to the guide rods 19 in order that both of the sliding racks 67 may be moved in unison.

As shown in the drawings, the rack cam 75 works in opposition to the rack retarding spring 76 to advance the sliding rack 67. It is through the means of the rack retarding spring 76 that the sliding rack 67 is drawn away from the drum D.

The design of the rack cam 75 is dictated by the characteristics of the roller advancing cam 51 and also the profile of the drum D plus layers of the fabric F on the drum being worked on. During the travel of the rollers 87 from the center portion of the drum D, the profile is almost straight. During this part of the horizontal travel of the rollers 87, the roller advancing cam 51 will allow but a slight forward motion of the rollers 87 and during this substantially horizontal travel of the rollers 87, the rack cam 75 will dictate but a slight turning motion to the roller spindles 88. Further explanation of the movements of the rollers will be given in the course of my description of the roller spindle turning mechanism.

Figure 6:
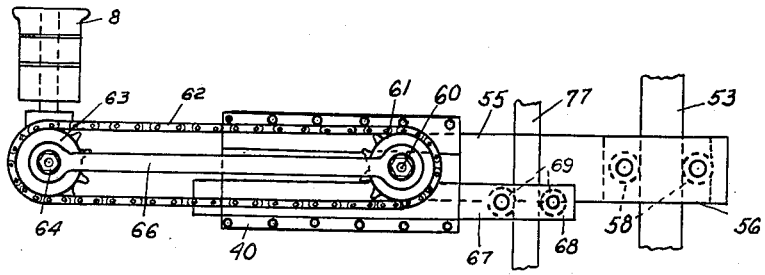
Figure 6 is an enlarged plan view of a portion of the tire making machine illustrated in Figure 1.
Figure 7:
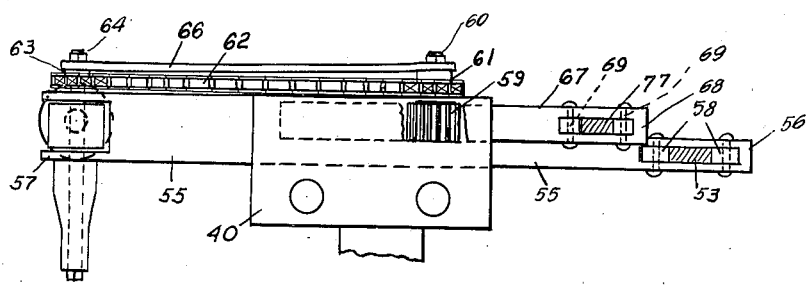
Figure 7 is a side elevation view, partly broken, of the construction illustrated by Figure 6.
Figure 9:
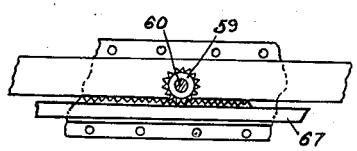
Figure 9 is a fragmentary plan view of the construction illustrated by Figure 6.
Figure 8:
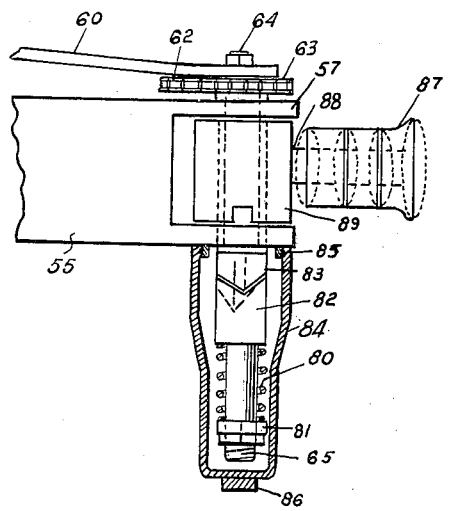
Figure 8 is an enlarged fragmentary view of a part of the structure illustrated by Figure 6.

The details of the roller spindle turning mechanism are best shown in Figure 6, Figure 7, and Figure 8 of the drawings illustrating only the right hand roller spindle turning mechanism. Since the left hand roller spindle turning mechanism is a complementary duplicate of the right hand roller spindle turning mechanism, no need is seen of describing it in detail.

When the roller carriage 55 is moved through the crosshead 40 with the sliding rack 67 held stationary, or when the rack 67 is moved in the same direction of travel as the roller carriage 55, but more slowly, or when the sliding rack 67 is moved in an opposite direction from the direction of motion of the roller carriage 55, or when the roller carriage 55 is held stationary while the sliding rack 67 is moved, there comes about a relative motion of the roller carriage 55 with respect to the sliding rack 67. It is this relative motion of the roller carriage 55 wih respect to the sliding rack 67 that accomplishes the rotation of the roller spindle 88 in a manner now to be explained.

A driving pinion 59 keyed to the driving pinion shaft 60 is rotatably mounted in the roller carriage 55 and is in mesh with the sliding rack 67 so that any relative motion of the roller carriage 55 with respect to the sliding rack 67 causes the driving pinion 59 to rotate. The driving pinion 59 has a chain driving sprocket 61 secured to it at a position above the roller carriage 55. A chain driven sprocket 63 is rotatably mounted transversely of the forward slotted end 57 of the roller carriage 55. A driving chain 62 is looped over both the driving sprocket 61 and the driven sprocket 63. The upper end of the pinion shaft 60 and the upper end of the sprocket shaft 64 are rotatably mounted in a spacing bar 66 which resists the pulling force of the driving chain 62.

The driven sprocket 63 is mounted on a sprocket shaft 64 that extends transversely through the forward slotted end 57 of the roller carriage 55 and through the hub 89 lying in the slotted end 57 of the roller carriage 55 which hub 89 is rotatably mounted in the roller carriage 55. The hub 89 carries the roller spindle 88 on which the sectional roller 87 is mounted.

As a matter of safety and for the purpose of regulating the pressure of the roller 87 on the drum D, I make provision in this roller spindle turning mechanism for a small amount of yield (shown by dotted lines in Figure 8) in the position of the roller spindle 88 dictated by the two cams, the roller advancing cam 51 and the rack cam 75, through the means of a yieldable clutch drive which I shall now describe.

The driving member of the yieldable clutch drive comprises the compression spring 80 which is adjustably clamped to the threaded lower end 65 of the sprocket shaft 64 and the sleeve clutch driving jaw 82 against which the spring 80 presses. The sleeve clutch driving jaw 82 is splined to the sprocket shaft 64 to allow it to move downwardly in opposition to the compression spring 80 while turning with the sprocket shaft 64 permitting the clutch driven jaw 83 together with the hub 89, of which it is an integral part, to rotate through a few degrees without becoming disengaged entirely from the sleeve clutch driving jaw 82. It is this lag that permits the small amount of yield in the angular position of the roller spindle 88 mentioned above.

It is pointed out here to the reader that the final adjustment of the pressure under which the roller 87 is applied to the drum D and the fabric F being worked on is determined by the pressure of the compression spring 80. The pressure of the compression spring 80 is controlled by setting of the compression spring nut 81. The compression spring 80, sleeve clutch driving jaw 82, and the driven jaw 83 are all enclosed by the shell 84. The shell 84 must be made large enough not to interfere with the adjustments in the compression spring 80 and movements of the driving jaw 82.

Now that the operation of my tire making machine has been explained to the reader, he can more readily understand from looking at Figure 1 how I am enabled to place the rollers 87 inside of the ends of the drum D into contacting position with the fabric F, turn the rollers 87 around the rim of the drum D and then draw the rollers 87 in a direction toward the center of the drum D turning the rollers 87 end for end in doing so. In carrying out tire making operations on the fabric F along the surface of the drum D, this machine may be so adjusted by a change in the cam settings that the rollers 87 may be started from a position at the center of the drum D in which the rollers 87 are extended parallel to the axis of the drum D and abutting each other in order to work the entire surface of the fabric F on the drum D.

Figure 10:
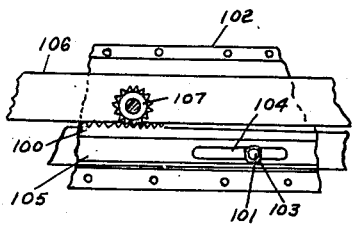
Figure 10 is a plan view of a modification of the structure illustrated by Figure 6.
Figure 5:
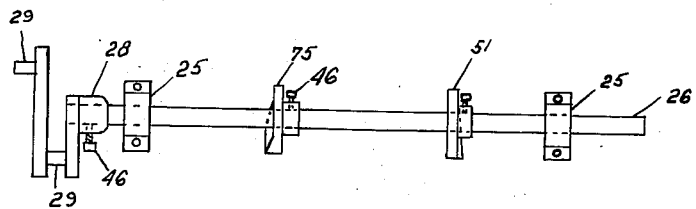
Figure 5 is an enlarged plan view of a portion of the tire making machine illustrated in Figure 1.
Figure 12:
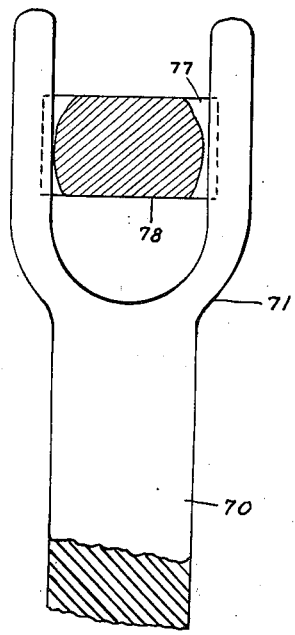
Figure 12 is an enlarged view of a portion of the machine illustrated by Figure 1.

In the modification of the rack 100 shown in Figure 10 of my drawings will be seen a rack modified by the inclusion of a stud 101. The stud 101 is extended through a slot 104 in an overflying plate 105 of a modified crosshead 102. A nut 103 also is provided for clamping the modified rack 100 in any desired longitudinally adjusted position in the crosshead 102. The roller carriage 106 and the pinion gear 107 are duplicates of the corresponding parts of the preferred embodiment of my tire making machine illustrated by Figure 1.

It is to be understood that in a tire making machine made according to the teachings of my invention, included in the modification above described, that the rack moving mechanism found in the preferred form of my tire making machine is omitted. In this modified form of the tire making machine, all of the motions given its roller will be under the control af a single cam positioned in a similar manner to the cam lever 47 of the preferred form of my tire making machine.

Many useful operations in the manufacture of tires can be accomplished by the modified form of my tire making machine which modified form resembles a form of tire making machine disclosed in a former patent application to which the instant application is a continuation in part.

Having thus described my invention, I claim:

1. In a tire making machine, a tire stitching roller mechanism for use with a tire drum comprising a roller adapted to contact the drum, a pressure applying means for moving the roller into contact with the drum along a radius of the drum, a means for moving the roller lengthwise of the drum including a slidably mounted crosshead on which the roller is mounted, a crankshaft, a connecting rod pivotally connected to the crankshaft and pivotally connected to a lever along a medial portion of the same, the free end of said lever being pivotably connected to said crosshead.

2. In a tire making machine, a tire stitching roller mechanism for use with a tire drum comprising a roller adapted to contact the drum, a roller turning mechanism comprising a slidably mounted roller carriage, a roller carrying hub on which said roller is mounted, rotatably mounted on said roller carriage, a driving means for rotating the hub including a driving pinion gear rotatably mounted on said carriage, said pinion gear being positioned in mesh with a rack and a means for producing a relative longitudinal motion of said carriage with respect to said rack.

3. The device as claimed in claim 2 wherein the said means for producing relative motion of said carriage with respect to said rack constitutes a means for moving said carriage.

4. The device as claimed in claim 2 wherein the said means for producing relative motion of said carriage with respect to said rack constitutes a means for moving said rack.

5. In a tire making machine, a tire stitching roller mechanism for use with a tire drum comprising a roller adapted to contact the drum, a roller pressure applying means for moving the roller into contact with the drum, a means for moving the roller lengthwise of the drum including a crankshaft, a slidable crosshead actuated through a lever means linked to the crankshaft by a connecting rod in which crosshead the roller is mounted, a roller turning means for turning the roller angularly to the drum including a roller carriage, mounted on said crosshead, a spindle on which the roller is rotatably mounted, a shaft connected to the spindle and extended at right angles to the spindle, said shaft being rotatably mounted in said carriage and a driving means for turning the shaft including a pinion gear rotatably mounted on said carriage in mesh with a rack mounted on said crosshead, said roller carriage being slidably mounted in said crosshead and connected to a roller carriage moving means adapted for moving said roller carriage through said crosshead to cause the pinion gear in mesh with said rack mounted on said crosshead to turn and thereby turn the spindle and the roller mounted on the spindle.

6. The machine as claimed in claim 5 wherein said rack is slidably mounted on said crosshead and connected to a rack moving means adapted to move said rack through said crosshead.

7. In a tire making machine, a tire stitching roller mechanism for use with a tire drum comprising a roller adapted to contact the drum, means for moving the roller lengthwise of the drum including a crosshead slidably mounted on a shaft extending lengthwise of and parallel to said drum and a means for turning the roller angularly to the drum comprising a roller carriage mounted on said crosshead, a spindle on which the roller is rotatably mounted, a shaft extended at a right angle to the spindle rotatably mounted in said carriage, a driven sprocket mounted on said shaft connected to a driving sprocket by a driving chain, said driving sprocket being joined to a pinion gear rotatably mounted in said carriage, said pinion gear being in mesh with a rack mounted on said crosshead, whereby a longitudinal movement of said pinion gear with respect to said rack will cause said pinion gear to rotate to cause said spindle carrying said roller to turn.

8. The machine as claimed in claim 7 wherein said shaft is connected to said spindle by a spring actuated slip clutch to allow for a lag in the movement of the roller from a force applied to the same in opposition to a turning force applied to the roller by said means for turning the roller angularly to the drum.

9. The machine as claimed in claim 7 wherein said rack is slidably mounted on said crosshead and connected to a rack moving means adapted to move said rack through said crosshead.

10. In a tire making machine, a tire stitching roller mechanism for use with a tire drum comprising a roller adapted to contact the drum, a pressure applying means for moving the roller into contact with the drum along a radius of the drum and a means for moving the roller lengthwise of the drum comprising a crankshaft, a connecting rod pivotably connected to the crankshaft and pivotably connected to a lever, a pull bar pivotably connected to the lever, said pull bar being connected to a slidably mounted crosshead on which the roller is mounted.

11. In a tire making machine, a tire stitching roller mechanism for use with a tire drum, comprising a roller adapted to contact the drum, a pressure applying means adapted to move the roller into contact with the drum and press the same against the drum along a radius of the drum, means for moving the roller in a straight line motion lengthwise of the drum comprising a guide extending parallel to the drum and a movable crosshead on which the roller is mounted slidably mounted on the guide, and a means for turning the roller angularly with respect to the drum comprising a spindle on which the roller is rotatably mounted, a shaft connected to the spindle extending at a right angle to the spindle, a driving means for turning the shaft comprising a pinion gear in mesh with a rack mounted on said crosshead whereby a longitudinal movement of the pinion gear with respect to the rack causes the spindle and the roller mounted on the spindle to rotate.

12. In a tire making machine, a tire stitching roller mechanism for use with a tire drum, comprising a roller adapted to contact the drum, a pressure applying means adapted to move the roller into contact with the drum and press the same against the drum along a radius of the drum, a means for moving the roller in straight line motion lengthwise of the drum and a means for turning the roller angularly to the drum, the means for moving the roller lengthwise of the drum comprising a guide extending parallel to the drum and a movable crosshead on which the roller is mounted, said crosshead being slidably mounted on the guide, the means for turning the roller angularly to the drum comprising a spindle on which the roller is rotatably mounted, a shaft connected to the spindle extending at a right angle to the spindle, a driving means for turning the shaft comprising a pinion gear in mesh with a rack mounted on said crosshead.

13. The machine as claimed in claim 12 wherein the means for turning the roller angularly to the drum includes a spring actuated slip clutch adapted to permit slip in the driving means whereby the roller may lag when turned by the driving means.

14. In a tire making machine, a tire stitching roller mechanism for use with a tire drum, comprising a roller adapted to contact the drum, a pressure applying means adapted to move the roller into contact with the drum and press the same against the drum along a radius of the drum, means for moving the roller in straight line motion lengthwise of the drum and a means for turning the roller angularly with respect to the drum, the means for moving the roller lengthwise of the drum comprising a guide extending parallel to the drum, a movable crosshead on which the roller is mounted slidably mounted on the guide, the means for turning the roller angularly with respect to the drum comprising a spindle on which the roller is rotatably mounted, a shaft connected to the spindle and extending at a right angle to the spindle, a driven sprocket mounted on the shaft connected to a driving sprocket by a chain, a pinion gear joined to the driving sprocket, a rack mounted on the crosshead with which said pinion gear is in mesh, whereby a longitudinal movement of the pinion gear in mesh with the rack with respect to the rack causes a rotation of the pinion gear resulting in a turning of the spindle and the roller carried by the spindle.

CONIOUS E. POWERS.

REFERENCES CITED

The following references are of record in the file of this patent:

UNITED STATES PATENTS

| Number | Name | Date |
| --- | --- | --- |
| 1,842,428 | Shook | Jan. 26, 1932 |
| 1,843,850 | Thropp et al. | Feb. 2, 1932 |
| 2,161,117 | Wikle | June 6, 1939 |